Jan. 1, 1929.　　　　　1,697,694
F. T. ROBERTS, JR
JACK ATTACHMENT FOR AUTOMOBILES
Filed Jan. 27, 1927
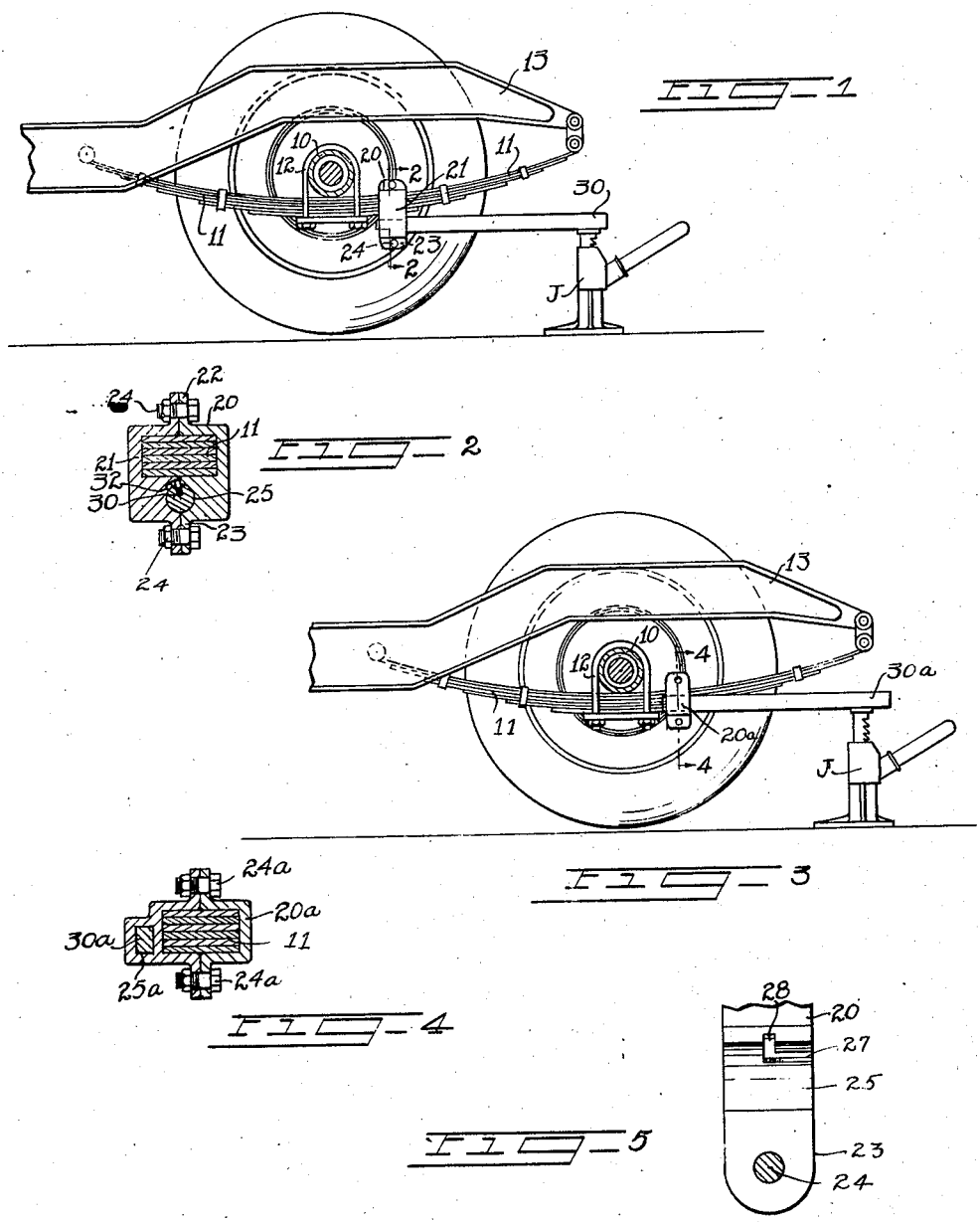

Patented Jan. 1, 1929.

1,697,694

UNITED STATES PATENT OFFICE.

FRED T. ROBERTS, JR., OF MONTCLAIR, NEW JERSEY.

JACK ATTACHMENT FOR AUTOMOBILES.

Application filed January 27, 1927. Serial No. 163,883.

This invention relates to a device adapted to be attached to an automobile and provide an accessible seat for the head of a lifting jack. In modern automobiles the space available for placing the jack, particularly at the rear, is very limited and what space there is is not readily accessible. One is also extremely liable to soil his garments in placing the jack under or adjacent the car axle. It is not ordinarily feasible to jack against the spring, on account of danger of distorting the leaves, as well as the liability of the car to slip off the jack head.

I have found that the difficulty may be avoided by securing to the spring, adjacent the axle, a suitable socket for receiving a removable bar adapted to extend toward the end of the car to a position readily available for the jack. By locating the socket adjacent the axle, it may be in a member clamped about all of the spring leaves, without interfering with the flexing of the spring as a whole. Such clamp may readily be made in two parts embracing the spring leaves and permanently secured thereto by bolts, and its socket for the movable bar may be beneath the spring or the side thereof as is most desirable for the particular make of car.

My clamp in no way interferes with the flexing of the spring in the operation of the car, and whenever desirable the removable bar (normally stored in the car) may be inserted in any of the sockets without difficulty, and thereby provide a jack seat in a convenient location near the end of the car.

My invention is hereinafter more fully described in connection with embodiments illustrated in the drawings. The essential novel features are set out in the claims.

In the drawings Fig. 1 is a fragmentary side elevation of an automobile provided at the rear with one form of my jack attachment; Fig. 2 is a cross section through the clamp as indicated by the line 2—2 on Fig. 1; Fig. 3 is a side elevation similar to Fig. 1 but showing a modified form of clamp; Fig. 4 is a cross section of the clamp shown in Fig. 3, the plane of the section being indicated by the line 4—4 on Fig. 3; Fig. 5 is an enlarged inner face view of a portion of one member of the clamp shown in Fig. 2.

Referring first to Figs. 1, 2 and 5, 10 designates the rear axle housing and 11 the rear spring of an automobile, shown as secured together by the usual U-bolts 12. The ends of the spring are suitably connected to the usual chassis frame 13.

My attachment, as shown in these figures, comprises a housing 20 clamped to the spring, and a bar 30, the inner end of which is seated in a socket in the housing and the outer end of which is adapted to be engaged by the lifting jack J. The housing 20, shown in cross section Fig. 2, comprises two blocks recessed at 21 to receive the leaves of the spring 11, and having projecting ears 22 and 23 through which pass bolts 24 rigidly clamping the housing about the spring. The recesses 21 preferably extend in such direction that the clamps stand vertical when in place, as shown in Fig. 1. Furthermore these recesses fit the spring tightly enough so that there is no danger of the clamp creeping.

The clamp 20 is provided with a socket 25 to receive the inner end of the extension bar 30. As shown in Figs. 2 and 5 this socket is made half in one member 20 and half in the other, by means of semicircular recesses, and is thus adapted to receive a reduced cylindrical extension of the bar 20. The bar is positioned by longitudinal movement from the end of the car whenever it is desired to use the attachment.

It may be desirable to lock the extension bar to the car when in use, and this may readily be effected by a sort of bayonet lock comprising a radial pin 32 on the bar which may register with a longitudinal groove 27 in the wall of the socket if the bar before insertion is given a slight axial turn from its normal position. At the inner end of this groove 27 is a communicating arcuate groove 28 and the pin travels circumferentially in this latter groove as the inserted extension bar is turned to normal position. Accordingly when the bar is in position with a horizontal undersurface, so that it may receive the jack head, it is locked to the clamp.

With some cars it is desirable that the extension bar be at the side of the spring instead of beneath it. Figs. 3 and 4 show an embodiment for such an installation. In these views the clamp 20ª embraces the spring and is held by bolts 24ª passing through ears on the clamp, the same as before. The socket however, 25ª is at the side of the spring, being carried entirely by one of the clamping members, as shown in Fig. 4. The socket, in this instance, is shown as rectangular in cross section, the inner end of the extension bar 30ª having a reduced rectangular portion adapted to seat in the socket. If desired suitable means may be employed for locking the extension bar in this clamp.

It will be seen that with either embodiment, I have provided a very simple attachment adapted to be permanently mounted on the different springs of an automobile, and ready to receive the extension bar as occasion may require. By mounting the device on the spring independently of the axle, I avoid the necessity for special constructions to meet varying axle forms, the springs being largely standard. The extension bar may be inserted in the socket without difficulty and without danger of soiling the operator's garments. When in place the jack may be readily positioned beneath the bar in a suitable location for convenient operation. The bar is so positioned as not to interfere with the downward flexing of the spring as the car is raised.

I claim:

1. An automobile attachment comprising a clamp adapted to be mounted on a vehicle spring and having a socket, and a removable extension bar, the inner end of which may engage said socket, the bar extending from the socket toward the end of the car.

2. An automobile attachment comprising a pair of members provided with means for clamping them about the leaves of a vehicle spring, the device so clamped providing holding means, and a removable extension bar, the inner end of which may engage said holding means.

3. An automobile attachment comprising a pair of members oppositely recessed and provided with means for clamping them about the leaves of a vehicle spring adjacent the axle, the device so clamped providing a socket, and an extension bar which may occupy said socket.

4. An automobile attachment comprising a pair of blocks recessed on their adjacent faces with rectangular recesses, said blocks having projecting ears, bolts passing through said ears to clamp the two blocks as a unit tightly about the spring, a longitudinally opening socket provided by such clamp, and an extension bar adapted to enter said socket.

5. The combination of an automobile having a spring, a clamp secured to the spring adjacent the axle, said clamp comprising a two part member having inner recesses to receive the spring and having a pair of upwardly and downwardly projecting ears through which pass bolts to hold the clamp tightly on the spring, there being also carried by said clamp a longitudinal recess adjacent the spring, and a longitudinal bar, the inner end of which is adapted to occupy the recess with the bar held adjacent the spring but out of any region into which the spring may flex as the car is raised.

6. The combination with an automobile axle and spring, of a device clamped thereon against the spring adjacent the axle and having a socket facing the end of the car and a removable extension bar formed at its inner end to engage said socket.

7. The combination with an automobile axle and spring, of a device rigidly clamped in place against the spring and adjacent the axle, said device having a socket of non-circular form and a removable extension bar formed at its inner end to engage said socket, and when in place in said socket being held thereby against troublesome rotation, said bar extending longitudinally of the car and having a flat under-surface for engagement by a jack head.

In testimony whereof, I hereunto affix my signature.

FRED T. ROBERTS, Jr.